(12) United States Patent
Jung

(10) Patent No.: US 7,639,894 B2
(45) Date of Patent: Dec. 29, 2009

(54) APPARATUS TO MEASURE NOISE IN IMAGE SIGNAL AND METHOD THEREOF

(75) Inventor: Jae-han Jung, Seoul (KR)

(73) Assignee: Samsung Electronics., Ltd., Suwon-si (KR)

( * ) Notice: Subject to any disclaimer, the term of this patent is extended or adjusted under 35 U.S.C. 154(b) by 582 days.

(21) Appl. No.: 11/129,286

(22) Filed: May 16, 2005

(65) Prior Publication Data

US 2005/0276503 A1 Dec. 15, 2005

(30) Foreign Application Priority Data

Jun. 15, 2004 (KR) .................. 10-2004-0043922

(51) Int. Cl.
*G06K 9/40* (2006.01)
(52) U.S. Cl. .................. 382/275; 348/572; 382/128; 382/131; 382/132; 382/254; 382/260; 382/261; 382/265; 704/233
(58) Field of Classification Search ............. 382/275, 382/261
See application file for complete search history.

(56) References Cited

U.S. PATENT DOCUMENTS

| | | | | |
|---|---|---|---|---|
| 4,761,819 | A * | 8/1988 | Denison et al. | 382/261 |
| 4,991,092 | A * | 2/1991 | Greensite | 382/131 |
| 5,005,081 | A | 4/1991 | Asano | |
| 5,673,332 | A * | 9/1997 | Nishikawa et al. | 382/128 |
| 5,850,294 | A * | 12/1998 | Apostolopoulos et al. | 358/426.14 |
| 5,909,515 | A * | 6/1999 | Makram-Ebeid | 382/260 |
| 5,911,012 | A * | 6/1999 | Bernard et al. | 382/260 |
| 6,473,131 | B1 * | 10/2002 | Neugebauer et al. | 348/572 |
| 7,324,678 | B2 * | 1/2008 | Allouche | 382/132 |
| 2002/0126910 | A1 * | 9/2002 | Gindele et al. | 382/254 |
| 2003/0189655 | A1 | 10/2003 | Lim et al. | |
| 2005/0114128 | A1 * | 5/2005 | Hetherington et al. | 704/233 |

FOREIGN PATENT DOCUMENTS

JP 2001-144964 5/2001

(Continued)

OTHER PUBLICATIONS

Hungarian Novelty Search Report dated Nov. 3, 2006 issued in P0500577.

(Continued)

*Primary Examiner*—Samir A. Ahmed
*Assistant Examiner*—Tsung-Yin Tsai
(74) *Attorney, Agent, or Firm*—Stanzione & Kim LLP

(57) ABSTRACT

An apparatus to measure noise in an image signal and a method thereof. The apparatus includes an area division unit to divide an image signal having noise therein into a plurality of areas and to output area information corresponding to the plurality of areas, a variance calculation unit to calculate variances of the plurality of areas using the area information, the image signal and a noise-attenuated image signal obtained by attenuating the noise from the image signal, and a noise determination unit to determine an amount of noise in the image signal by comparing the calculated variances of the plurality of areas. Accordingly, the noise measurement apparatus can measure the amount of noise irrespective of characteristics of the image signal, and thus noise attenuation can be performed more accurately.

13 Claims, 3 Drawing Sheets

FOREIGN PATENT DOCUMENTS

| KR | 1998-84165 | 12/1998 |
|---|---|---|
| WO | WO 02/01855 | 1/2002 |

OTHER PUBLICATIONS

Dutch Office Action dated May 18, 2007 issued in Dutch Patent Application No. 1029260.

Lee, J-S: "Digital Image Enhancement and Noise Filtering by Use of Local Statistics" IEEE Transactions on Pattern Analysis and Machine Intelligence, IEEE Service Center, Los Alamito, CA; vol. Pami-2, No. 2, Mar. 1980; pp. 165-168.

Deng G et al: "An Adaptive Gaussian Filter for Noise Reduction and Edge Detection;" Nuclear Science Symposium and Medical Imaging Conference Record. San Francisco, CA; Oct. 31, 1993; pp. 1615-1619.

Sun X. Z. et al.: "Adaptive Filters Based on Local Estimates" ISCAS' 88 Proceedings, Jun. 7, 1988; pp. 2549-2552.

Rank K. et al.: "Estimation of Image Noise Variance" IEE Proceedings: Vision, Image and Signal Processing, Institution of Electrical Engineers, vol. 146, No. 2, Apr. 23, 1999; pp. 80-84.

Lee J-S: "Digital Image Smoothing and The Sigma Filter" Computer Vision Graphics and Image Processing, vol. 24 (1983); pp. 255-269.

* cited by examiner

APPARATUS TO MEASURE NOISE IN IMAGE SIGNAL AND METHOD THEREOF

CROSS-REFERENCE TO RELATED APPLICATIONS

This application claims benefit under 35 U.S.C. § 119 from Korean Patent Application No. 2004-43922, filed on Jun. 15, 2004, the entire content of which is incorporated herein by reference.

BACKGROUND OF THE INVENTION

1. Field of the Invention

The present general inventive concept relates to an apparatus to measure noise in an image signal and a method thereof, and more particularly, to an apparatus to measure an amount of noise in an image signal, usable with a process of attenuating the noise in the image signal, and a method thereof.

2. Description of the Related Art

Noise added to an image signal is the main cause of deterioration of image quality and lowering of performance of encoding and decoding of the image signal. Accordingly, many techniques for improving the image quality and the performance of encoding and decoding of the image signal by attenuating noise added to the image signal have been developed. In order to attenuate the noise added to the image signal, an amount of noise added to the image signal should first be measured accurately. For this, apparatuses for measuring noise in an image signal have been used. The amount of noise measured by the noise measurement apparatuses is generally expressed by a variance value or standard deviation that is the square root of the variance value.

FIG. 1 is a block diagram illustrating a conventional apparatus for measuring noise in an image signal. Referring to FIG. 1, the conventional apparatus for measuring the noise in the image signal includes a SAD (Sum of Absolute Difference) calculation unit 10, a SAD comparison unit 20, a SAD counter 30, a comparison unit 40 and a variation counter 50.

The SAD calculation unit 10 calculates the sum of absolute difference (SAD) values among adjacent pixels of an input image. The SAD comparison unit 20 compares the calculated SAD value and detects whether each SAD value calculated by the SAD calculation unit 10 belongs to a predetermined range as a result of the comparison. The SAD comparison unit 20 outputs a true value if the calculated SAD value belongs to the predetermined range and outputs a false value if the calculated SAD value does not belong to the predetermined range. A counted value of the SAD counter 30 is increased if the output of the SAD comparison unit 20 is the true value. The SAD counter 30 is reset for a period of a picture (i.e., field or frame). Accordingly, the SAD counter 30 counts the SAD values that belong to the predetermined range for each picture.

The comparison unit 40 compares the value of the SAD counter 30 with a predetermined value. If the output value of the SAD counter 30 is less than the predetermined value, the comparison unit 40 makes the variation counter 50 perform an up-counting, while if the output value of the SAD counter 30 is greater than the predetermined value, the comparison unit 40 makes the variation counter 50 perform a down-counting, for the period of a picture. The output value of the variation counter 50, which is increased and decreased according to the comparison unit 40, becomes a noise measurement value, and this noise measurement value is fed back to the SAD comparison unit 20 to be referred to in determining the predetermined range.

However, the conventional apparatus for measuring noise in the image signal as described above has the drawbacks in that the noise measurement value is calculated according to the SAD distribution of the image signal, and thus the noise measurement value may be differently calculated according to the characteristics of the image signals irrespective of the amount of noise applied to the image signals.

For example, even if the amount of noise applied to an image that is complicated or has many minute parts is the same as that applied to an image that is simple or has many flat parts, the noise measurement value may differently be calculated according to the SAD value distribution. Accordingly, it is necessary to calculate an accurate noise measurement value irrespective of the characteristics of the image signal.

SUMMARY OF THE INVENTION

The present general inventive concept provides an apparatus to measure noise in an image signal and a method thereof that can accurately measure an amount of noise irrespective of characteristics of the image signal by dividing the image signal having the noise therein into a plurality of areas according to the characteristics of the image signal and measuring the amount of noise using variances of the divided areas.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an apparatus to measure noise in an image signal, the apparatus including an area division unit to divide an image having noise therein into a plurality of areas and to output area information corresponding to the plurality of areas, a variance calculation unit to calculate variances of the plurality of areas using the output area information, the image and a noise-attenuated image obtained by attenuating the noise from the image, and a noise determination unit to determine an amount of noise in the image by comparing the calculated variances of the plurality of areas.

The image may be divided into a first area and a second area, and the noise determination unit may judge whether a first variance that is the variance of the first area approximates a second variance that is the variance of the second area and may determine the amount of noise in the image based on a result of the judgment.

The noise determination unit may determine a value less than a previously determined amount of noise as the amount of noise if it is judged that the first variance is not approximately equal to the second variance.

The noise determination unit may determine the value less than the previously determined amount of noise as the amount of noise if it is judged that the first variance is greater than the second variance.

The variance calculation unit may recalculate the first variance and the second variance using the noise-attenuated image recreated based on the amount of noise determined by the noise determination unit, and the noise determination unit may maintain the determined amount of noise if it is judged that the first variance is approximately equal to the second variance.

The noise determination unit may determine a value greater than the previously determined amount of noise as the amount of noise if it is judged that the first variance is approximately equal to the second variance.

The variance calculation unit may recalculate the first variance and the second variance using the noise-attenuated image recreated based on the amount of noise determined by the noise determination unit, and the noise determination unit may maintain the determined amount of noise if it is judged that the first variance does not approximate the second variance.

The first area may be an edge area that includes edge components, and the second area may be another area that does not include the edge components.

The plurality of areas include at least one of a high-frequency area, an intermediate area, a flat area, an edge area, and a texture area. The high-frequency area, the intermediate area and the flat area may be areas divided according to a size of high-frequency components in the image, the edge area may be an area that includes edge components in the image, and the texture area may be an area that includes same-quality components in the image.

The foregoing and/or other aspects of the present general inventive concept may also be achieved by providing a method of measuring noise in an image signal, the method including dividing an image having noise therein into a plurality of areas and outputting area information corresponding to the plurality of areas, calculating variances of the plurality of areas using the output area information, the image and a noise-attenuated image obtained by attenuating the noise from the image, and determining an amount of noise in the image by comparing the calculated variances of the plurality of areas.

The image may be divided into a first area and a second area, and the determining of the amount of noise in the image may include judging whether a first variance that is the variance of the first area approximates a second variance that is the variance of the second area and determining the amount of noise in the image based on a result of the judgment.

The determining of the amount of noise may include determining a value less than a previously determined amount of noise as the amount of noise if it is judged that the first variance does not approximate the second variance.

The determining of the amount of noise may include determining the value less than the previously determined amount of noise as the amount of noise if it is judged that the first variance is greater than the second variance.

The determining of the amount of noise may include determining a value greater than the previously determined amount of noise as the amount of noise if it is judged that the first variance approximates the second variance.

The first area may be an edge area that includes edge components, and the second area may be another area that does not include the edge components.

The plurality of areas may include at least one of a high-frequency area, an intermediate area, a flat area, an edge area and a texture area. The high-frequency area, the intermediate area and the flat area may be areas divided according to a size of high-frequency components in the image, the edge area may be an area that includes edge components in the image, and the texture area may be an area that includes same-quality components in the image.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
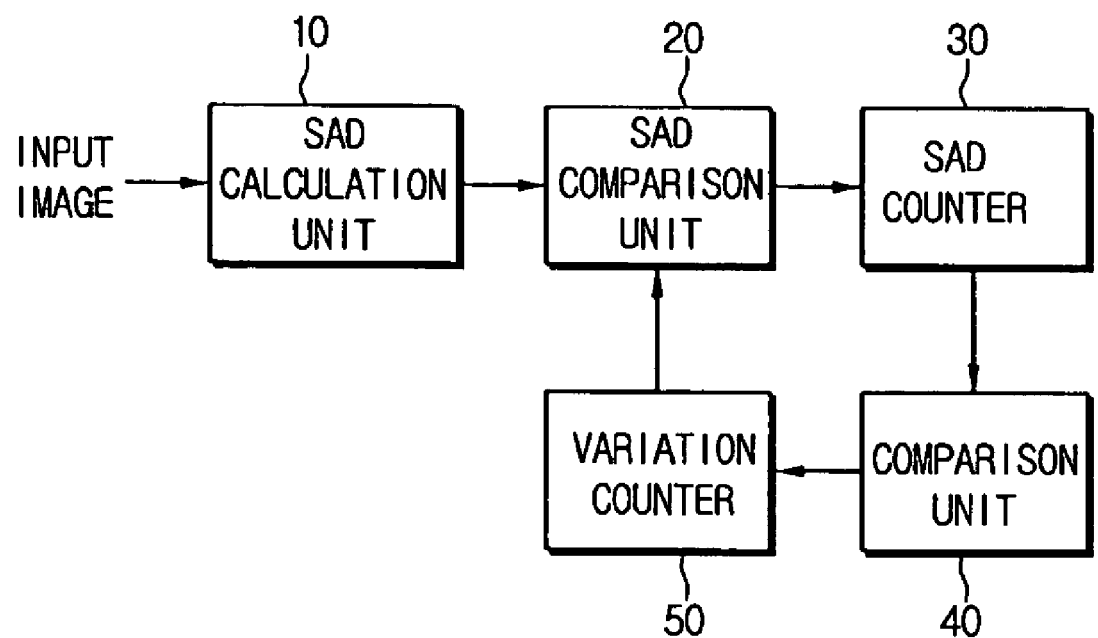
FIG. 1 is a block diagram illustrating a conventional apparatus for measuring noise in an image signal.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
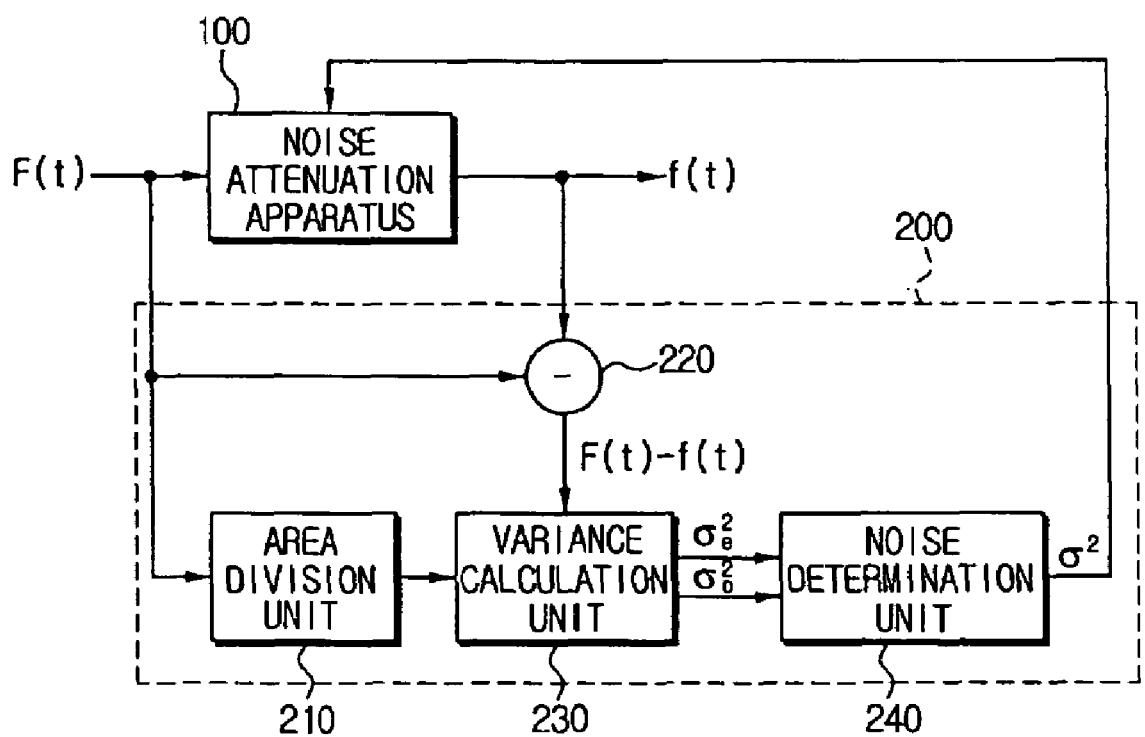
FIG. 2 is a block diagram illustrating an apparatus to measure noise in an image signal according to an embodiment of the present general inventive concept.

FIG. 2 is a block diagram illustrating an apparatus 200 to measure noise in an image signal according to an embodiment of the present general inventive concept. Referring to FIG. 2, a noise attenuation apparatus 100 is illustrated in addition to the noise measuring apparatus 200.

The noise attenuation apparatus 100 receives an image signal having noise therein (hereinafter referred to as a 'noise-added image signal') F(t), attenuates the noise, and then outputs an image signal in which the noise is attenuated (hereinafter referred to as a 'noise-attenuated image signal') f(t).

The noise attenuation apparatus 100 calculates a noise attenuation rate based on an amount of noise $\sigma^2$ output from the noise measuring apparatus 200, and attenuates the noise from the noise-added image signal F(t) according to the calculated noise attenuation rate.

The noise measuring apparatus 200 is an apparatus to measure the amount of noise $\sigma^2$ using the noise-added image signal F(t) and the noise-attenuated image signal f(t). The noise measuring apparatus 200 includes an area division unit 210, a subtraction unit 220, a variance calculation unit 230 and a noise determination unit 240.

The area division unit 210 divides the noise-added image signal F(t) into an edge area and another area. The edge area is an area that includes edge components in the noise-added image signal F(t), and the other area is an area that does not include the edge components in the noise-added image F(t).

After the area division is completed, the area division unit 210 outputs area information to the variance calculation unit 230. The area information includes edge area information corresponding to the edge area and other area information corresponding to the other area. The edge area information refers to coordinate values $(x_e, y_e)$ of pixels corresponding to the edge area, and the other area information refers to coordinate values $(x_o, y_o)$ of pixels corresponding to the other area.

The subtraction unit 220 calculates a difference image signal F(t)−f(t) between the noise-added image signal F(t) and the noise-attenuated image signal f(t). In this case, the subtraction unit 220 may calculate an absolute value |F(t)−f(t)| of the difference image signal F(t)−f(t).

The variance calculation unit 230 receives the edge area information and the other area information from the area division unit 210 and the difference image signal F(t)−f(t) from the subtraction unit 220. Additionally, the variance calculation unit 230 calculates a variance $\sigma_e^2$ of the edge area using the edge area information and the difference image signal F(t)−f(t), and calculates a variance $\sigma_o^2$ of the other area using the other area information and the difference image signal F(t)−f(t). Specifically, the variance calculation unit 230 calculates the variance $\sigma_e^2$ of the edge area and the variance $\sigma_o^2$ of the other area according to [Equation 1] below.

$$\sigma_e^2 = \Sigma(F(x_e,y_e) - f(x_e,y_e))^2 / (\text{Number of Pixels in Edge Area})$$

$$\sigma_o^2 = \Sigma(F(x_o,y_o) - f(x_o,y_o))^2 / (\text{Number of Pixels in Other Area})$$

[Equation 1]

Here, $F(x_e,y_e) - f(x_e,y_e)$ denotes pixel values of the pixels corresponding to the edge area among pixels of the difference image signal $F(t) - f(t)$, and $F(x_o,y_o) - f(x_o,y_o)$ denotes pixel values of the pixels corresponding to the other area among the pixels of the difference image signal $F(t) - f(t)$. The number of pixels of the edge area and the number of pixels of the other area can be calculated using the edge area information and the other area information.

The noise determination unit 240 determines the amount of noise $\sigma^2$ in the noise-added image $F(t)$ using the variance $\sigma_e^2$ of the edge area and the variance $\sigma_o^2$ of the other area calculated by the variance calculation unit 230, and outputs the determined amount of noise $\sigma^2$ to the noise attenuation apparatus 100. Because the determined amount of noise $\sigma^2$ is used to control the operations of the noise attenuation apparatus 100, a degree of the noise attenuation already performed by the noise attenuation apparatus 100 should be reflected in determining the amount of noise $\sigma^2$.

Accordingly, the noise determination unit 240 judges the degree of the noise attenuation already performed by the noise attenuation apparatus 100 by first comparing the variance $\sigma_e^2$ of the edge area with the variance $\sigma_o^2$ of the other area. The noise determination unit 240 then determines the amount of noise $\sigma^2$ according to a result of the judgment.

Hereinafter, a process of properly adjusting the noise attenuation if the noise attenuation performed in the noise attenuation apparatus 100 is excessive is described.

If it is judged that the variance $\sigma_e^2$ of the edge area is greater than the variance $\sigma_o^2$ of the other area, the noise determination unit 240 judges that the noise attenuation performed in the noise attenuation apparatus 100 is excessive. If the noise attenuation performed in the noise attenuation apparatus 100 is excessive, the edge components in the edge area are attenuated in addition to the noise, and the variance $\sigma_e^2$ of the edge area becomes greater than the variance $\sigma_o^2$ of the other area as a result. Accordingly, in order to reduce the degree of the noise attenuation of the noise attenuation apparatus 100, the noise determination unit 240 determines a value less than a previously determined amount of noise as the amount of noise $\sigma^2$.

Accordingly, the noise attenuation apparatus 100 can perform the noise attenuation with a noise attenuation rate lower than that previously determined, and re-output a corrected noise-attenuated image signal f(t). The subtraction unit 220 then recalculates the corrected difference image signal $F(t)-f(t)$, and the variance calculation unit 230 recalculates the variance $\sigma_e^2$ of the edge area and the variance $\sigma_o^2$ of the other area according to the recalculated difference image signal $F(t)-f(t)$ and outputs the recalculated variances $\sigma_e^2$ and $\sigma_o^2$ to the noise determination unit 240.

Then, the noise determination unit 240 re-compares the recalculated variance $\sigma_e^2$ of the edge area with the recalculated variance $\sigma_o^2$ of the other area. If the recalculated variance $\sigma_e^2$ of the edge area is greater than the recalculated variance $\sigma_o^2$ of the other area (i.e., if the comparison result is similar to the previous comparison result), the noise determination unit 240 judges that the noise attenuation performed in the noise attenuation apparatus 100 is still excessive. Accordingly, the noise determination unit 240 determines a value much less than the previously determined amount of noise as the amount of noise $\sigma^2$.

By contrast, if the recalculated variance $\sigma_e^2$ of the edge area is approximately equal to the recalculated variance $\sigma_o^2$ of the other area (i.e., if the comparison result is different from the previous comparison result), the noise determination unit 240 judges that proper noise attenuation is performed in the noise attenuation apparatus 100. Accordingly, the noise determination unit 240 maintains the previously determined amount of noise $\sigma^2$.

Hereinafter, a process of properly adjusting the noise attenuation if the noise attenuation performed in the noise attenuation apparatus 100 is insufficient is described.

If it is judged that the variance $\sigma_e^2$ of the edge area is approximately equal to the variance $\sigma_o^2$ of the other area, the noise determination unit 240 judges that the noise attenuation performed in the noise attenuation apparatus 100 is insufficient. If the noise attenuation performed in the noise attenuation apparatus 100 is insufficient, only the noise existing in the other area is attenuated, but the noise existing in the edge area is not attenuated, and the variance $\sigma_e^2$ of the edge area is approximately equal to the variance $\sigma_o^2$ of the other area. Accordingly, in order to heighten the degree of the noise attenuation of the noise attenuation apparatus 100, the noise determination unit 240 determines a value greater than the previously determined amount of noise as the amount of noise $\sigma^2$.

Accordingly, the noise attenuation apparatus 100 can perform the noise attenuation with a noise attenuation rate higher than that previously determined, and re-output the corrected noise-attenuated image signal f(t). The subtraction unit 220 then recalculates the corrected difference image signal $F(t)-f(t)$, and the variance calculation unit 230 recalculates the variance $\sigma_e^2$ of the edge area and the variance $\sigma_o^2$ of the other area according to the recalculated difference image signal $F(t)-f(t)$ and outputs the recalculated variances $\sigma_e^2$ and $\sigma_o^2$ to the noise determination unit 240.

Then, the noise determination unit 240 re-compares the recalculated variance $\sigma_e^2$ of the edge area with the recalculated variance $\sigma_o^2$ of the other area. If the recalculated variance $\sigma_e^2$ of the edge area is approximately equal to the recalculated variance $\sigma_o^2$ of the other area (i.e., if the comparison result is similar to the previous comparison result), the noise determination unit 240 judges that the noise attenuation performed in the noise attenuation apparatus 100 is still insufficient. Accordingly, the noise determination unit 240 determines a value much greater than the previously determined amount of noise as the amount of noise $\sigma^2$.

By contrast, if the recalculated variance $\sigma_e^2$ of the edge area is greater than the recalculated variance $\sigma_o^2$ of the other area (i.e., if the comparison result is different from the previous comparison result), the noise determination unit 240 judges that proper noise attenuation is performed in the noise attenuation apparatus 100. Accordingly, the noise determination unit 240 maintains the previously determined amount of noise $\sigma^2$.

Figure 3:
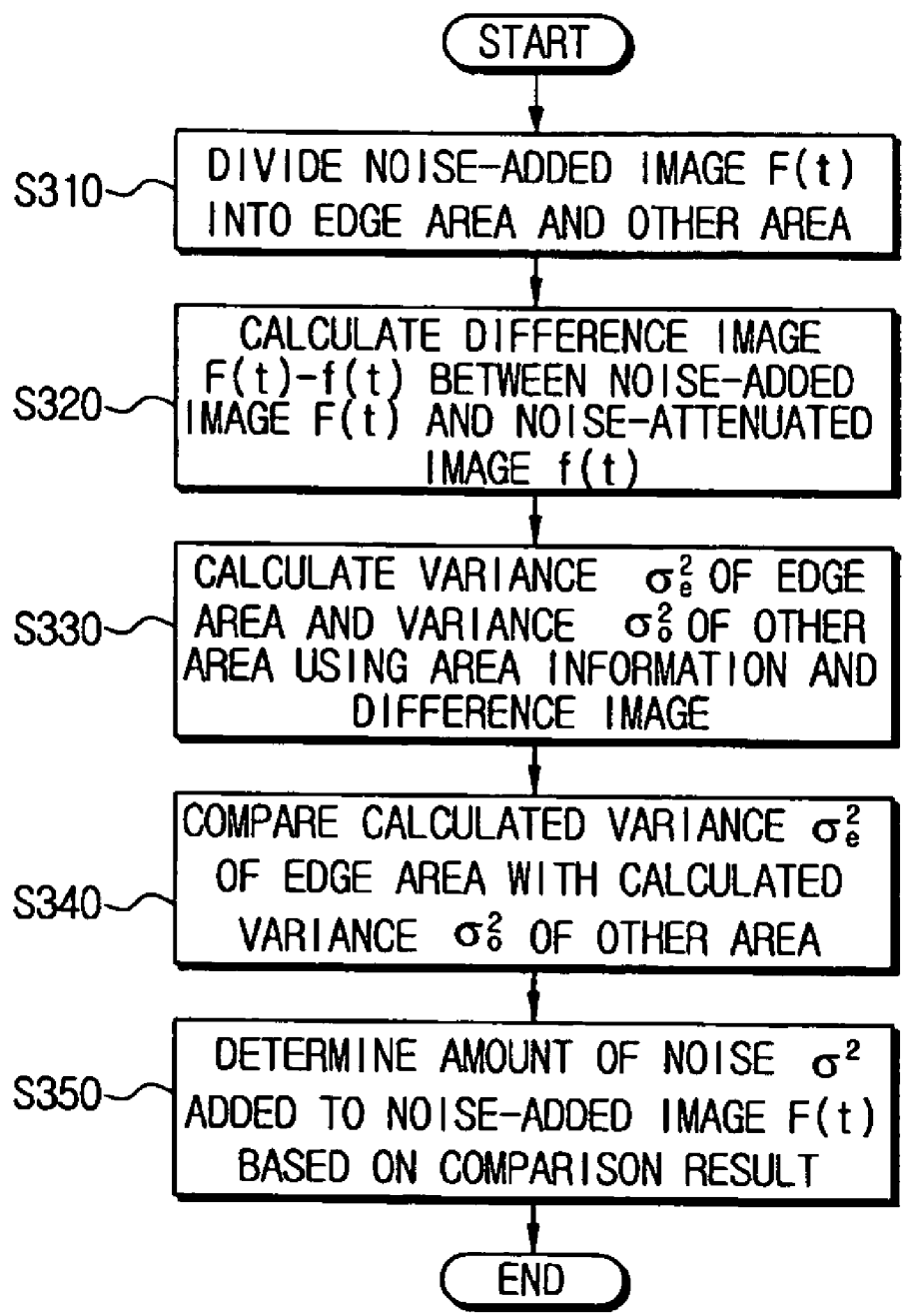
FIG. 3 is a flowchart illustrating a method of measuring noise in an image signal according to an embodiment of the present general inventive concept.

FIG. 3 is a flowchart illustrating a method of measuring noise in an image signal in the noise measurement apparatus 200, according to an embodiment of the present general inventive concept.

Referring to FIGS. 2-3, the area division unit 210 divides the noise-added image signal F(t) into the edge area and the other area (S310). Then, the area division unit 210 outputs the edge area information and the other area information to the variance calculation unit 230.

The subtraction unit 220 calculates the difference image signal F(t)–f(t) between the noise-added image signal F(t) and the noise-attenuated image signal f(t) (S320). The subtraction unit 220 may calculate an absolute value |F(t)–f(t)| of the difference image signal F(t)–f(t).

The variance calculation unit 230 calculates the variance $\sigma_e^2$ of the edge area and the variance $\sigma_o^2$ of the other area using the edge area information, the other area information and the difference image signal F(t)–f(t) (S330). The variance calculation unit 230 calculates the variance $\sigma_e^2$ of the edge area and the variance $\sigma_o^2$ of the other area according to [Equation 1], as described above.

The noise determination unit 240 compares the variance $\sigma_e^2$ of the edge area with the variance $\sigma_o^2$ of the other area calculated by the variance calculation unit 230 (S340).

Then, the noise determination unit 240 determines the amount of noise $\sigma^2$ added to the noise-added image signal F(t) based on a result of the comparison at operation S340 (S350).

As described above, the noise determination unit 240 judges the degree of the noise attenuation performed by the noise attenuation apparatus 100 by comparing the variance $\sigma_e^2$ of the edge area with the variance $\sigma_o^2$ of the other area, and then determines the amount of noise $\sigma^2$ according to a result of judgment.

Specifically, if it is judged that the variance $\sigma_e^2$ of the edge area is greater than the variance $\sigma_o^2$ of the other area, the noise determination unit 240 judges that the noise attenuation performed in the noise attenuation apparatus 100 is excessive, and thus determines a value less than the previously determined amount of noise as the amount of noise $\sigma^2$. Then, if the result of comparing the recalculated variance $\sigma_e^2$ of the edge area with the recalculated variance $\sigma_o^2$ of the other area is similar to the previous result of comparison, the noise determination unit 240 judges that the noise attenuation performed in the noise attenuation apparatus 100 is still excessive, and thus determines a value much less than the previously determined amount of noise as the amount of noise $\sigma^2$. By contrast, if the result of comparison is different from the previous result of comparison (i.e., the recalculated variance $\sigma_e^2$ of the edge area is approximately equal to the recalculated variance $\sigma_o^2$ of the other area), the noise determination unit 240 judges that proper noise attenuation has been performed in the noise attenuation apparatus 100, and thus maintains the previously determined amount of noise $\sigma^2$.

Meanwhile, if it is judged that the variance $\sigma_e^2$ of the edge area is approximately equal to the variance $\sigma_o^2$ of the other area, the noise determination unit 240 judges that the noise attenuation performed in the noise attenuation apparatus 100 is insufficient, and thus determines a value greater than the previously determined amount of noise as the amount of noise $\sigma^2$. Thereafter, if the result of comparing the recalculated variance $\sigma_e^2$ of the edge area with the recalculated variance $\sigma_o^2$ of the other area is the same as the previous comparison result, the noise determination unit 240 judges that the noise attenuation performed in the noise attenuation apparatus 100 is still insufficient, and thus determines a value much greater than the previously determined amount of noise as the amount of noise $\sigma^2$. By contrast, if the result of comparing the recalculated variance $\sigma_e^2$ of the edge area with the recalculated variance $\sigma_o^2$ of the other area is different from the previous result of comparison (i.e., the recalculated variance $\sigma_e^2$ of the edge area is greater than the recalculated variance $\sigma_o^2$ of the other area), the noise determination unit 240 judges that proper noise attenuation is performed in the noise attenuation apparatus 100, and thus maintains the previously determined amount of noise $\sigma^2$.

If the noise-added image signal F(t) is composed of simple and flat areas only, i.e., if the noise-added image signal F(t) has no edge area, the variance $\sigma_e^2$ of the edge area is always '0', but the variance $\sigma_o^2$ of the other area has a specified value. In this case, the amount of noise $\sigma^2$ determined by the noise determination unit 240 is continuously increased, and thus the degree of the noise attenuation performed by the noise attenuation apparatus 100 may become excessive. In order to prevent this, the noise determination unit 240 can be constructed to limit an upper threshold value of the determined amount of noise $\sigma^2$.

Meanwhile, if the noise-added image signal F(t) has no edge area, the noise attenuation performed in the noise attenuation apparatus 100 may be excessive, but the image quality does not deteriorate. Accordingly, the noise attenuation may not affect the image quality even if the upper threshold value of the amount of noise $\sigma^2$ is not limited.

Additionally, if the noise-added image signal F(t) is composed of complicated and minute areas only, i.e., if the noise-added image signal F(t) has edge areas only (for example, if the image represents a lawn), the variance $\sigma_o^2$ of the other area is always '0', but the variance $\sigma_e^2$ of the edge area has a specified value. In this case, the amount of noise $\sigma^2$ determined by the noise determination unit 240 is continuously decreased, and thus the degree of the noise attenuation performed by the noise attenuation apparatus 100 may become insufficient. Accordingly, the noise determination unit 240 can be constructed to limit a lower threshold value of the amount of noise $\sigma^2$.

Meanwhile, if the noise-added image signal F(t) has the edge areas only, the noise attenuation performed in the noise attenuation apparatus 100 may become insufficient, but the image quality does not deteriorate. Accordingly, the noise attenuation may not affect the image quality even if the lower threshold value of the amount of noise $\sigma^2$ is not limited.

As described above, the noise-added image signal F(t) is divided into the edge area having the edge components and the other area that does not include the edge area, however, the present general inventive concept is not limited thereto. For example, the noise-added image signal F(t) may be divided into a high-frequency area, an intermediate area, a flat area, an edge area, a texture area that includes same-quality components, etc., or into a part of the above-described areas.

Additionally, as described above, the amount of noise is determined by comparing variances of the divided areas and the output amount of noise is expressed by the variance. However, this is also exemplary, and it will be apparent that the present general inventive concept can also be implemented using standard deviation instead of the variance.

As described above, according to the present the embodiments of the general inventive concept, an amount of noise is measured by dividing an image signal having noise therein into a plurality of areas according to characteristics of the image signal and measuring the amount of noise using variances for the divided areas. Accordingly, the amount of noise can accurately be measured irrespective of the characteristics of the image signal. Additionally, in accordance with a noise measurement performed by a noise measurement apparatus, a noise attenuation apparatus can perform the noise attenuation more accurately.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to measure noise in an image signal, the apparatus comprising:
   an area defining unit to define a plurality of areas of an input image signal according to a characteristic of the input image signal;
   a subtracting unit to generate a difference signal based on the input image signal and an input noise-attenuated image signal and to transmit the generated difference signal to the noise determining unit;
   the noise determination unit to determine an amount of noise in the input image signal according to noise values of the respective areas, and to calculate the noise value corresponding to each of the plurality of areas of the difference signal, and to compare the calculated noise value corresponding to each of the plurality of areas of the difference signal to determine a second amount of noise,
   wherein the plurality of areas include at least one of a high frequency area, an intermediate area, a flat area, an edge area, and a texture area.

2. The apparatus as claimed in claim 1, further comprising:
   a variance calculation unit to calculate the noise values according to area information of the plurality of areas.

3. The apparatus as claimed in claim 2, wherein the variance calculation unit calculates other noise values as the noise according to the input image signal and another signal which is a signal processed from the input image signal according to the determined amount of noise.

4. The apparatus as claimed in claim 3, wherein the noise determination unit determines another amount of noise as the amount of noise according to the second noise values.

5. The apparatus as claimed in claim 1, further comprising:
   an external device to process the input image signal according to the determined amount of noise.

6. The apparatus as claimed in claim 1, wherein the noise value corresponding to each of the plurality of areas comprises one of a variance and a standard deviation of each of the plurality of areas.

7. The apparatus as claimed in claim 1, wherein the noise determination unit calculates one of a variance and a standard deviation between the input image signal and the noise-attenuated image signal obtained by processing the input image signal according to the determined amount of noise with respect to the plurality of areas, and compares the calculated one of the variance and the standard deviation in each of the plurality of areas to determine a degree of noise attenuation of the noise-attenuated image signal.

8. The apparatus as claimed in claim 7, wherein the plurality of areas comprises a first area corresponding to a first characteristic of the input image signal and a second area corresponding to a second characteristic of the input image signal, and the noise determination unit determines the degree of noise attenuation to be insufficient when the calculated one of the variance and the standard deviation of the first area is substantially equal to that of the second area and to be excessive when the calculated one of the variance and the standard deviation of the first area is greater than that of the second area.

9. The apparatus as claimed in claim 7, wherein the noise determination unit adjusts a level of noise attenuation in an external noise attenuation apparatus according to the determined degree of noise attenuation to regenerate the noise-attenuated image signal.

10. The apparatus as claimed in claim 9, wherein the attenuation measuring unit recalculates the one of the variance and the standard deviation between the input image signal and the regenerated attenuated image signal in each of the plurality of areas and compares the recalculated one of the variance and the standard deviation in each of the plurality of areas to redetermine the degree of noise attenuation.

11. A method of measuring noise in an image signal with an apparatus to measure noise, the method comprising:
    defining a plurality of areas of an image signal according to characteristics of the image signal with the apparatus to measure noise, wherein the plurality of areas include at least one of a high-frequency area, an intermediate area, a flat area, an edge are, and a texture area;
    generating a difference signal based on the input image signal and an input noise-attenuated image signal with the apparatus to measure noise;
    calculating a noise value corresponding to each of the defined plurality of areas and the noise value corresponding to each of the plurality of areas of the difference signal, with the apparatus to measure noise; and
    determining an amount of noise in the image signal with the apparatus to measure noise by comparing the calculated noise values corresponding to the plurality of areas, and comparing the calculated noise values corresponding to each of the plurality of areas of the difference signal to determine a second amount of noise.

12. The method as claimed in claim 11, further comprising:
    controlling an external device with the apparatus to measure noise to process the image signal according to the determined amount of noise.

13. The method as claimed in claim 11, wherein the calculating of the noise value corresponding to each or the defined plurality of areas comprises:
    calculating one of a variance or a standard deviation of each of the plurality of areas with the apparatus to measure noise.

* * * * *